US012313995B2

(12) United States Patent
Hamada et al.

(10) Patent No.: US 12,313,995 B2
(45) Date of Patent: May 27, 2025

(54) IMAGE FORMING DEVICE AND IMAGE FORMING METHOD

(71) Applicant: TOSHIBA TEC KABUSHIKI KAISHA, Tokyo (JP)

(72) Inventors: Yusuke Hamada, Mishima Shizuoka (JP); Sou Miyazaki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/389,837

(22) Filed: Dec. 20, 2023

(65) Prior Publication Data

US 2024/0272574 A1 Aug. 15, 2024

(30) Foreign Application Priority Data

Feb. 13, 2023 (JP) ................. 2023-020118

(51) Int. Cl.
*G03G 15/00* (2006.01)
*G03G 9/09* (2006.01)
*G06K 15/02* (2006.01)

(52) U.S. Cl.
CPC ..... *G03G 15/5095* (2013.01); *G03G 15/6585* (2013.01); *G06K 15/1842* (2013.01); *G03G 9/0926* (2013.01); *G03G 15/5016* (2013.01); *G03G 2215/00814* (2013.01)

(58) Field of Classification Search
CPC .......... G03G 15/5095; G03G 15/6585; G03G 9/0926; G03G 15/5016; G03G 2215/00814; G06K 15/1842
See application file for complete search history.

(56) References Cited

U.S. PATENT DOCUMENTS

| | | | |
|---|---|---|---|
| 9,229,362 B1 * | 1/2016 | Takahashi | G03G 15/08 |
| 10,657,840 B2 | 5/2020 | Yamada | |
| 11,117,402 B2 * | 9/2021 | Kannari | H04N 1/0044 |
| 2016/0103644 A1 * | 4/2016 | Saito | H04N 1/00411 |
| | | | 358/1.15 |
| 2018/0129162 A1 * | 5/2018 | Takahashi | G03G 15/2039 |
| 2018/0373184 A1 * | 12/2018 | Doi | G03G 21/00 |

FOREIGN PATENT DOCUMENTS

| | | | |
|---|---|---|---|
| JP | 2007-144703 | | 6/2007 |
| JP | 2016097587 A | * | 5/2016 |
| JP | 2020-202538 | | 12/2020 |
| JP | 2021019310 A | * | 2/2021 |

OTHER PUBLICATIONS

JP-2016097587-A, English Translation (Year: 2016).*
JP-2021019310-A, English Translation (Year: 2021).*

* cited by examiner

*Primary Examiner* — Ryan D Walsh
(74) *Attorney, Agent, or Firm* — Amin, Turocy & Watson, LLP

(57) ABSTRACT

Provided is a technique that can suitably form a cut line. According to one embodiment, an image forming device includes a line information generation unit and an image forming unit. The line information generation unit generates line information representing a cut line to cut out a main image formed on a recording medium. The image forming unit forms the main image with a non-decolorable material on the recording medium and forms the cut line represented by the line information with a decolorable material on the recording medium. The line information generation unit changes a level of curving of a curve included in the cut line, according to the recording medium.

20 Claims, 7 Drawing Sheets

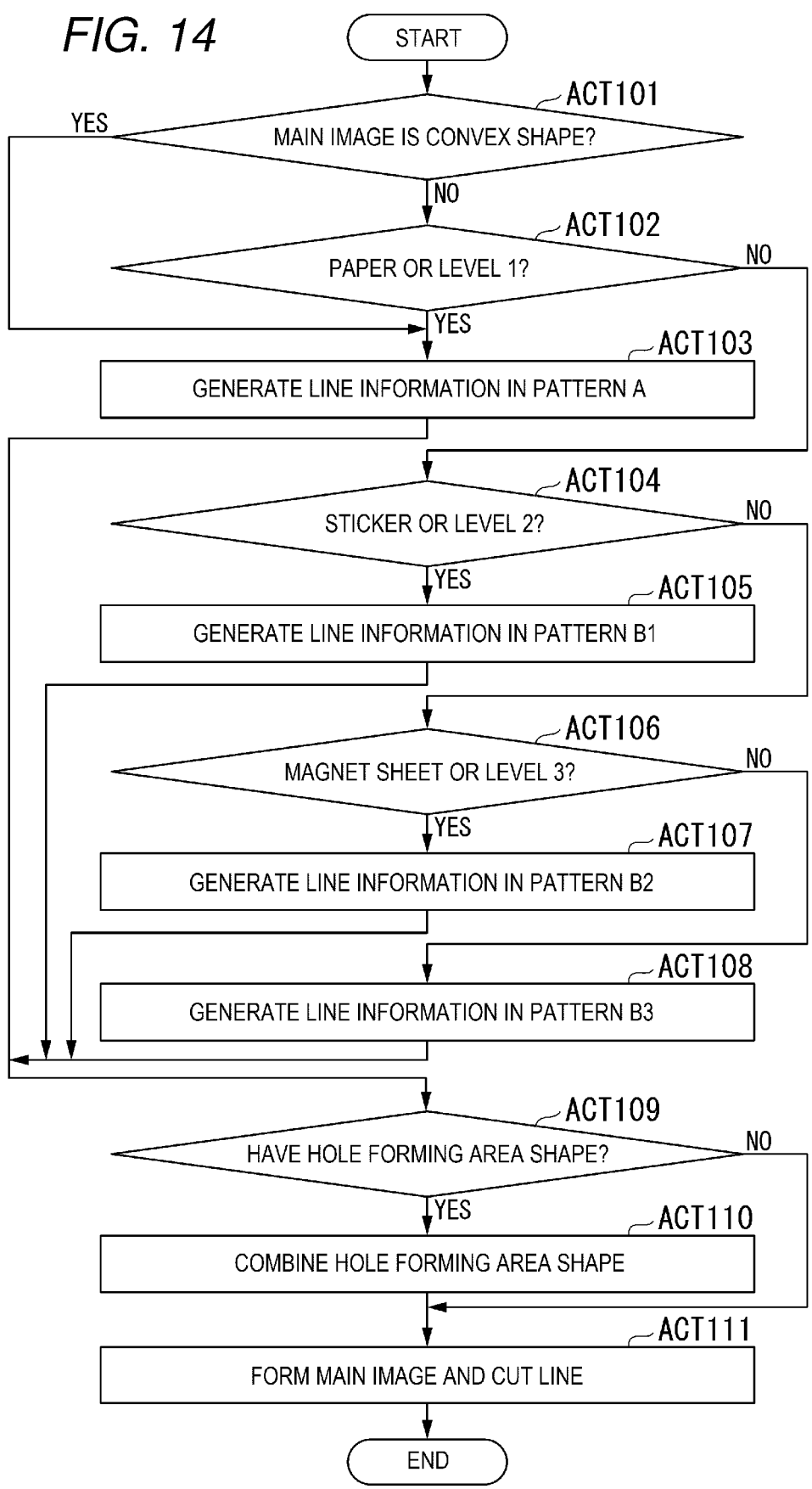

IMAGE FORMING DEVICE AND IMAGE FORMING METHOD

CROSS-REFERENCE TO RELATED APPLICATION

This application is based upon and claims the benefit of priority from Japanese Patent Application No. 2023-20118, filed on Feb. 13, 2023, the entire contents of which are incorporated herein by reference.

FIELD

Embodiments described herein relate generally to an image forming device and an image forming method.

BACKGROUND

According to the related art, a technique of forming a cut line on a cuttable recording medium when printing on the recording medium, in order to make it easier to cut out a main image, is provided.

If a cut line is uniformly formed according to the main image without taking the recording medium into consideration, a problem arises in that the main image may not be able to be easily cut out, depending on the recording medium.

DESCRIPTION OF THE DRAWINGS

FIG. 14 is a flowchart showing a flow of processing by the image forming device.

DETAILED DESCRIPTION

An embodiment described herein is to provide a technique that can suitably form a cut line.

In general, according to one embodiment, an image forming device includes a line information generation unit and an image forming unit. The line information generation unit generates line information representing a cut line to cut out a main image formed on a recording medium. The image forming unit forms the main image with a non-decolorable material on the recording medium and forms the cut line represented by the line information with a decolorable material on the recording medium. The line information generation unit changes a level of curving of a curve included in the cut line, according to the recording medium.

An image forming device according to an embodiment is configured to be able to suitably form a cut line. The image forming device according to the embodiment will now be described in detail.

Figure 1:
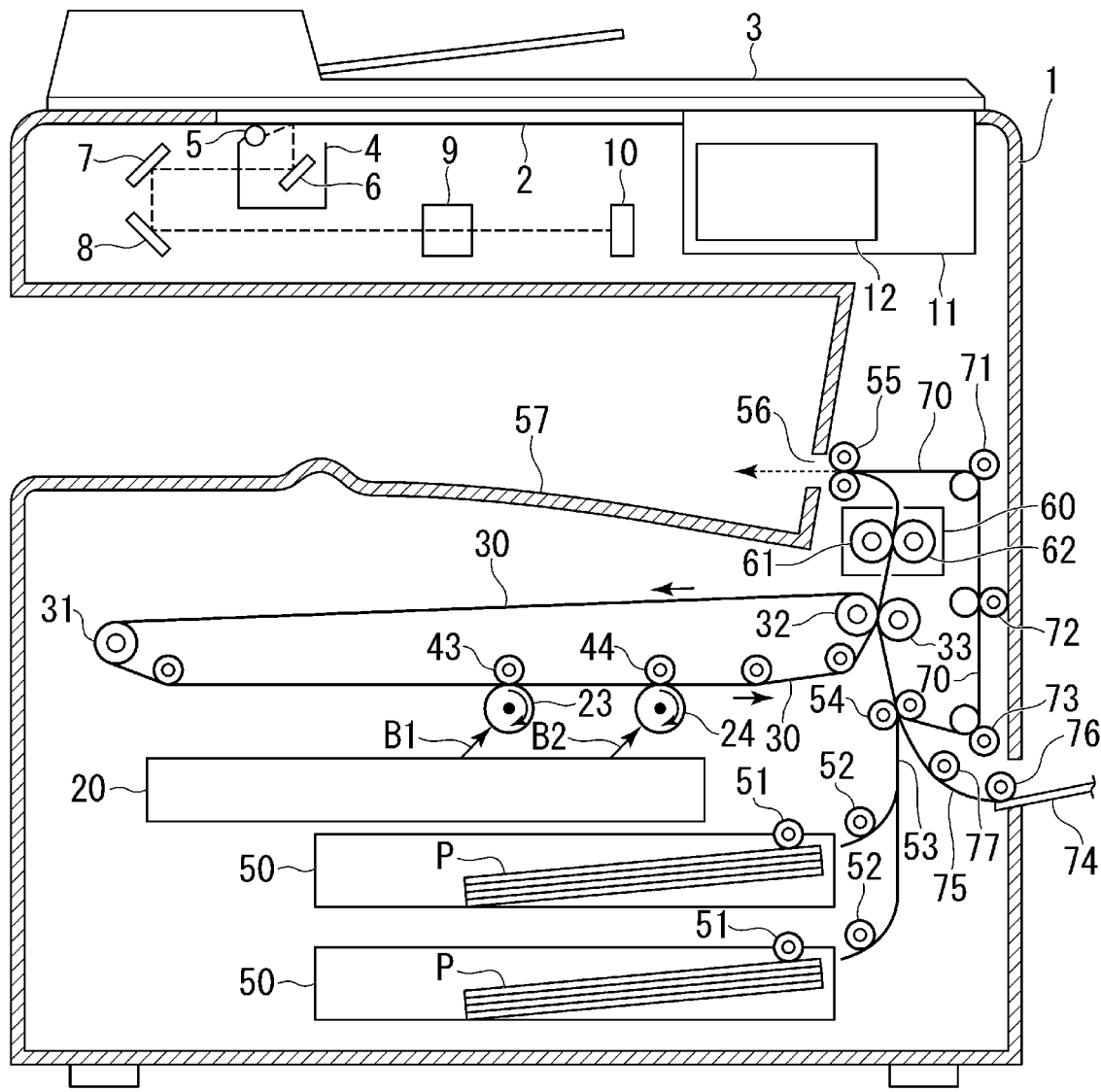
FIG. 1 is a side view of an image forming device according to an embodiment.

FIG. 1 is a side view of an image forming device 1 according to an embodiment. The image forming device 1 according to the embodiment is configured to be able to form an image with a first color material and a second color material. In this embodiment, a black toner is used as an example of the first color material. A decolorable toner is used as an example of the second color material. The black toner is a non-decolorable material. The decolorable toner is a decolorable material. The decolorable toner has a lower density of color development than the black toner. The decolorable toner develops color and becomes visible at a temperature lower than a predetermined value, and is decolored and becomes invisible at a temperature equal to or higher than the predetermined value. In this embodiment, a main image is formed with the black toner. The cut line to cut out the main image is formed with the decolorable toner. The main image in this embodiment refers to an image for which the cut line is to be generated. The cut line is a closed curve surrounding the main image.

The image forming device 1 according to the embodiment has a copy function. As a document in the copy function, a non-decolorable sheet where an image is formed with a non-decolorable material such as black toner or a sheet where an image is formed with a decolorable toner can be read. The non-decolorable sheet is not limited to a sheet where an image is formed with a single color, but also includes a sheet where an image is formed with multiple colors.

As shown in FIG. 1, a transparent document table (glass sheet) 2 to place a document is arranged at a top part of the image forming device 1. A cover 3 is arranged over the document table 2 in such a way as to be able to open and close. A carriage 4 is arranged facing the bottom side of the document table 2. An exposure lamp 5 is arranged in the carriage 4.

The carriage 4 moves back and forth along the bottom side of the document table 2. The exposure lamp 5 exposes a document on the document table 2 to light as the carriage 4 moves forth. A reflected light image generated by this exposure is received by a CCD (charge-coupled device) 10 via reflection mirrors 6, 7, 8 and a variable-magnification lens block 9. The CCD 10 outputs an image signal of a level corresponding to the reflected light image from the document, on a per color basis of R (red), G (green), and B (blue).

Near the document table 2, a control panel 11 that displays information to a user and accepts an operation from the user is arranged. The control panel 11 has a touch panel-type liquid crystal display unit 12.

An exposure unit 20 receives the image signal outputted from the CCD 10. The exposure unit 20 emits a laser beam B1 corresponding to the image signal of the decolorable toner toward a photoconductor drum 23, which is an image carrier for decolorable toner. The exposure unit 20 emits a laser beam B2 corresponding to the image signal of the black toner toward a photoconductor drum 24, which is an image carrier for black toner.

A transfer belt 30 is arranged above the photoconductor drums 23, 24. The transfer belt 30 is laid over a drive roller 31 and a driven roller 32. The transfer belt 30 receives a motive power from the drive roller 31 and turns counterclockwise.

At a position facing the photoconductor drum 23, a primary transfer roller 43 is arranged in such a way as to be able to move up and down. At a position facing the photoconductor drum 24, a primary transfer roller 44 is arranged in such a way as to be able to move up and down. The primary transfer roller 43 rotates while pressing the transfer belt 30 to the circumferential surface of the photoconductor drum 23, and thus transfers an image on the photoconductor drum 23 to the transfer belt 30. The primary transfer roller 44 rotates while pressing the transfer belt 30 to the circumferential surface of the photoconductor drum 24, and thus transfers an image on the photoconductor drum 24 to the transfer belt 30.

Figure 2:
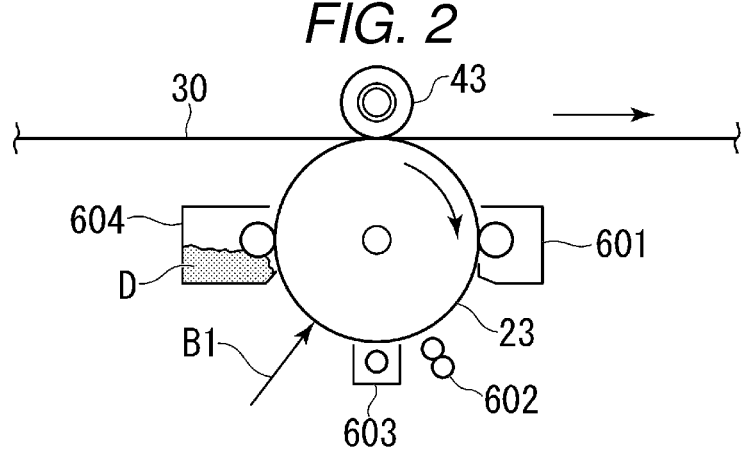
FIG. 2 shows a configuration of a photoconductor drum and peripheral parts thereof.

FIG. 2 shows the configuration of the photoconductor drum 23 and peripheral parts thereof. A cleaner 601, a de-electrifying lamp 602, a charging unit 603, and a development unit 604 are arranged around the photoconductor drum 23. The cleaner 601 eliminates a developer remaining on the surface of the photoconductor drum 23. The de-electrifying lamp 602 eliminates electric charges remaining on the surface of the photoconductor drum 23. The charging unit 603 charges the surface of the photoconductor drum 23 with static electric charges.

The surface of the photoconductor drum 23 already charged by the charging unit 603 receives the laser beam B1 emitted from the exposure unit 20. The laser beam B1 forms an electrostatic latent image on the surface of the photoconductor drum 23. The development unit 604 supplies a decolorable developer D to the surface of the photoconductor drum 23 and thus develops the electrostatic latent image on the surface of the photoconductor drum 23.

The peripheral parts of the photoconductor drum 24 are similarly configured. Therefore, the description of these parts is omitted. A black developer D is supplied to the photoconductor drum 24. The foregoing photoconductor drum 23 and the peripheral parts thereof may be collectively referred to as a first image forming unit. The first image forming unit forms a single-color image with the black toner. The photoconductor drum 24 and the peripheral parts thereof may be collectively referred to as a second image forming unit. The second image forming unit forms a single-color image with the decolorable toner.

A plurality of paper feed cassettes 50 are arranged below the exposure unit 20. These paper feed cassettes 50 contain a number of recording media P of different sizes from each other. The recording medium that can be contained in the paper feed cassettes 50 or a recording medium that can be placed on a manual feed tray 74, described later, may be any medium on which an image can be formed. In this embodiment, a paper, a sticker, a magnet sheet, and a plastic sheet are employed as an example of the recording medium. In the description below, the recording medium may be referred to as "sheet".

A pickup roller 51 and a paper feed roller 52 are arranged at positions corresponding to the paper feed cassettes 50. Each pickup roller 51 takes out the sheets P in each paper feed cassette 50 one by one. Each paper feed roller 52 supplies the sheet P taken out by each pickup roller 51 to a conveyance path 53. The conveyance path 53 extends to a paper discharge port 56 arranged above, via a registration roller 54, the driven roller 32, a fixing unit 60, and a paper discharge roller 55. The paper discharge port 56 faces a paper discharge tray 57.

A secondary transfer roller 33 is arranged at a position across the transfer belt 30 and the conveyance path 53 from the driven roller 32. The secondary transfer roller 33 transfers the image transferred to the transfer belt 30, to the sheet P fed from the registration roller 54.

A conveyance path 70 is arranged from the terminal end of the conveyance path 53 to an upstream position of the registration roller 54. The conveyance path 70 reverses the sides of the sheet P and returns the sheet P to the conveyance path 53. The conveyance path 70 has paper feed rollers 71, 72, 73.

The manual feed tray 74 is removably arranged at a sidewall of the image forming device 1. A conveyance path 75 is arranged from the manual feed tray 74 to an upstream position of the registration roller 54 in the conveyance path 53. A pickup roller 76 and a paper feed roller 77 are arranged at positions corresponding to the conveyance path 75. The pickup roller 76 takes out the sheets on the manual feed tray 74 one by one. The paper feed roller 77 supplies the sheet taken out by the pickup roller 76 to the registration roller 54.

The fixing unit 60 has a heat roller 61 and a pressure roller 62. The fixing unit 60 heats the conveyed sheet P at a temperature (for example, 100° C.) lower than a predetermined value (for example, 120° C.) by the heat roller 61 and thus fixes the image transferred to the sheet P, in a visible state to the sheet P. The fixing unit 60 also heats the conveyed sheet P where the image is to be made invisible, at a temperature (for example, 130° C.) equal to or higher than the predetermined value by the heat roller 61, and thus makes the image on the sheet P invisible.

Figure 3:
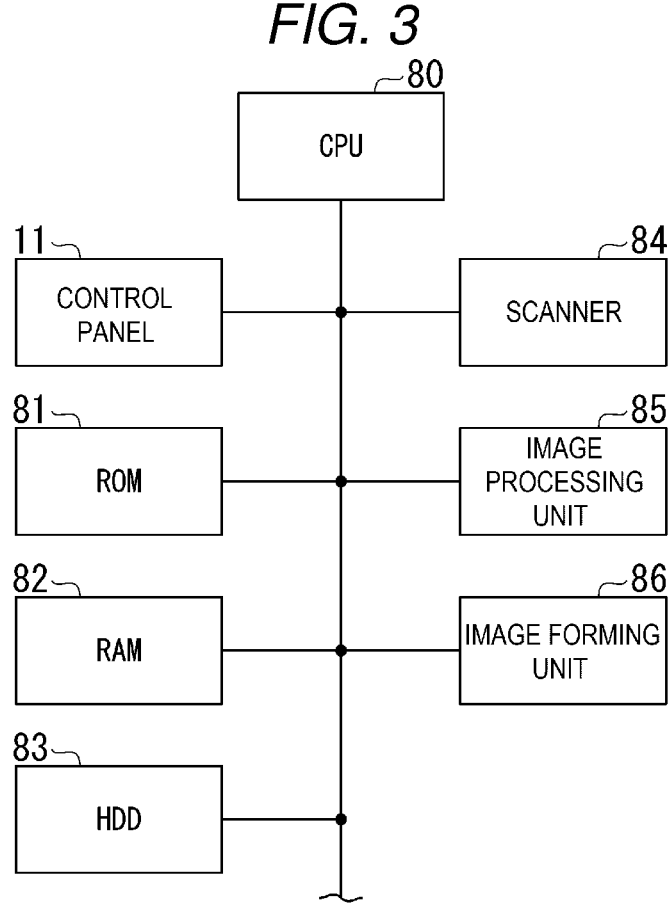
FIG. 3 shows a control circuit of the image forming device.

FIG. 3 shows a control circuit of the image forming device 1.

The control panel 11, a ROM 81, a RAM 82, a hard disk drive (HDD) 83, a scanner 84, an image processing unit 85, and an image forming unit 86 are coupled to a CPU 80 of a computer.

The control panel 11 has a numeric keypad, a start key, and the like, as well as a touch panel-type liquid crystal display unit.

The ROM 81 stores various programs for control. The RAM 82 stores various data. The hard disk drive 83 stores image data. The scanner 84 includes the carriage 4, the exposure lamp 5, the reflection mirrors 6, 7, 8, the variable-magnification lens block 9, and the CCD 10. The scanner 84 optically scans and reads a document on the document table 2 and acquires image data representing the document. The image processing unit 85 performs various kinds of processing on the image data acquired by the scanner 84. In this embodiment, the image processing unit 85 also generates line information representing a cut line to cut out a main image formed on the recording medium.

The image forming unit 86 has the exposure unit 20, the photoconductor drums 23, 24, the configuration around each photoconductor drum shown in FIG. 2, the transfer belt 30, the drive roller 31, the driven roller 32, the primary transfer rollers 43, 44, the secondary transfer roller 33, the conveyance path 53, the fixing unit 60, and the conveyance path 70 or the like. The image forming unit 86 forms, on the sheet P, an image represented by the image data processed by the image processing unit 85. In this embodiment, the image forming unit 86 also forms a main image with a non-decolorable material on the recording medium and forms the cut line represented by the line information with a decolorable material on the sheet.

Figure 4:
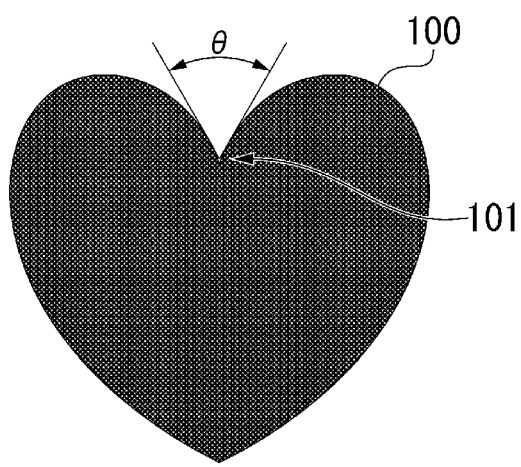
FIG. 4 shows a main image.

The main image and the cut line will now be described. First, in this embodiment, the level of curving of a curve included in the cut line is changed according to the recording medium. This will now be described specifically, using an illustration. FIG. 4 shows a main image 100. In this embodiment, the main image 100 is heart-shaped as an example. The "level of curving" in this embodiment refers to the curvature at a point on the cut line. In the case of a point where the curvature cannot be defined such as a vertex, the level of curving refers to the angle of the vertex.

Figure 5:
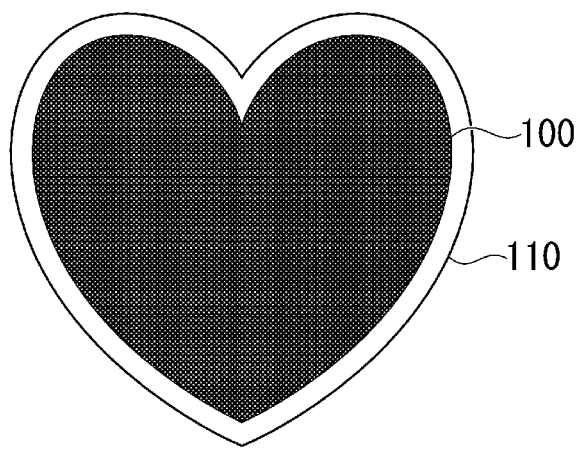
FIG. 5 shows a cut line generated along the main image.

For example, the main image 100 shown in FIG. 4 has a vertex 101, where an angle θ is formed. The level of curving becomes higher as θ becomes smaller. The level of curving becomes lower as θ becomes closer to 180 degrees. FIG. 5 shows a cut line generated simply along the main image. The shape of an area formed by a cut line 110 shown in FIG. 5 is similar to the shape of the main image. Therefore, θ does not change and the level of curving is thus held as it is.

Figure 6:
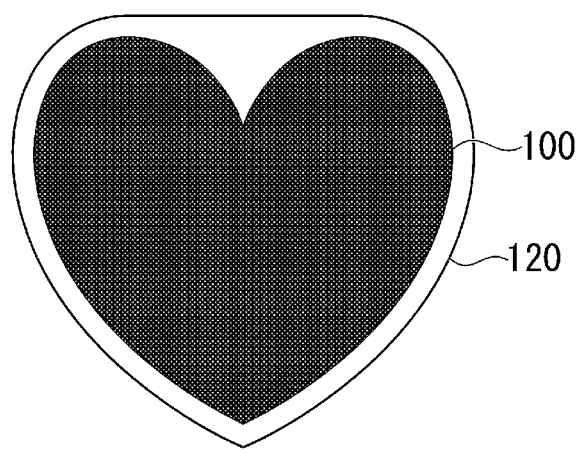
FIG. 6 shows a cut line changed to have a gentler level of curving.

If the level of curving is high, it is harder to cut the image out of a thick sheet or a hard sheet. To cope with this, the level of curving is changed to be gentler, as shown in FIG. 6 (in the case of FIG. 6, the curve is changed to a straight line). This makes it easier to cut out the image than in the case where the level of curving is not changed. Thus, this embodiment can provide a technique that can suitably form a cut line 120.

Figure 7:
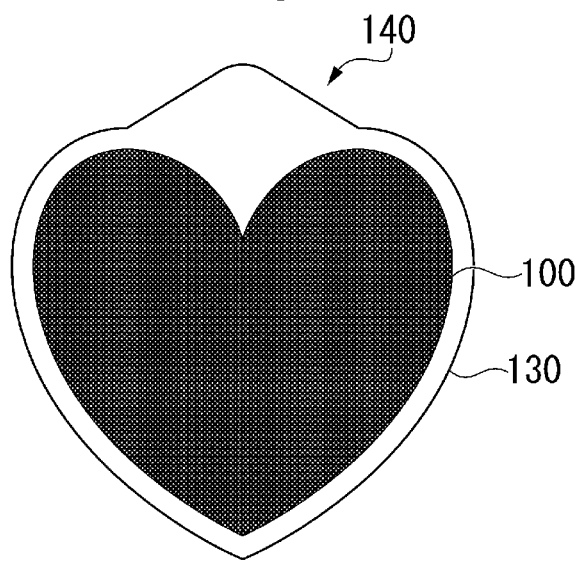
FIG. 7 shows a cut line with a hole forming area shape combined.

FIG. 7 shows a cut line 130 with a hole forming area shape combined. For example, a hole through which to insert a key ring or the like may be formed in a plastic sheet or the like. The hole forming area shape is a shape to secure an area where a hole is formed. In this embodiment, a triangular hole forming area shape 140 is combined, as shown in FIG. 7. The hole forming area shape is stored in advance in the ROM 81 or the HDD 83 or the like. A dashed line indicating the base of the hole forming area shape shown in FIG. 7 is a dashed line for explanation and therefore is not formed on the actual recording medium. In this way, in this embodiment, a closed curve that surrounds the main image 100 and that forms an area where a predetermined shape (for example, the hole forming area shape 140) is formed is generated as a cut line.

Figure 8:
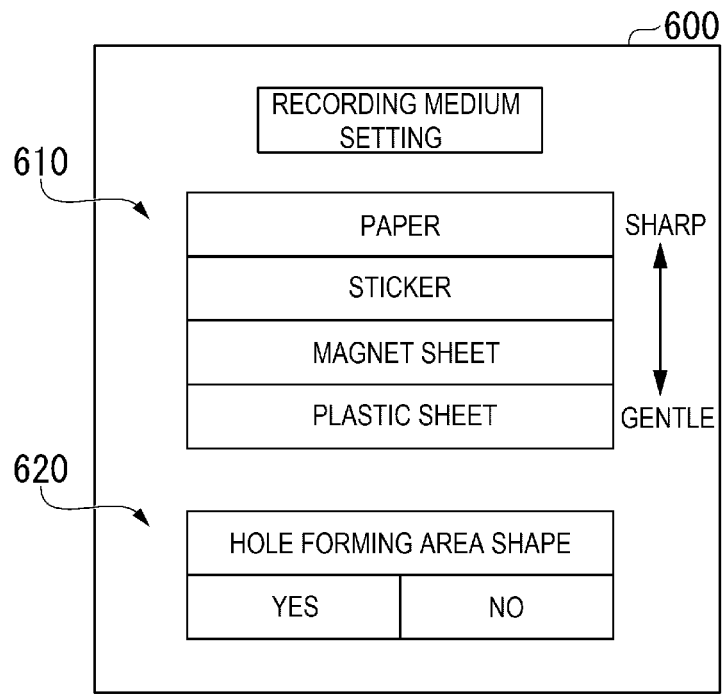
FIG. 8 shows a setting menu displayed on a control panel.
Figure 9:
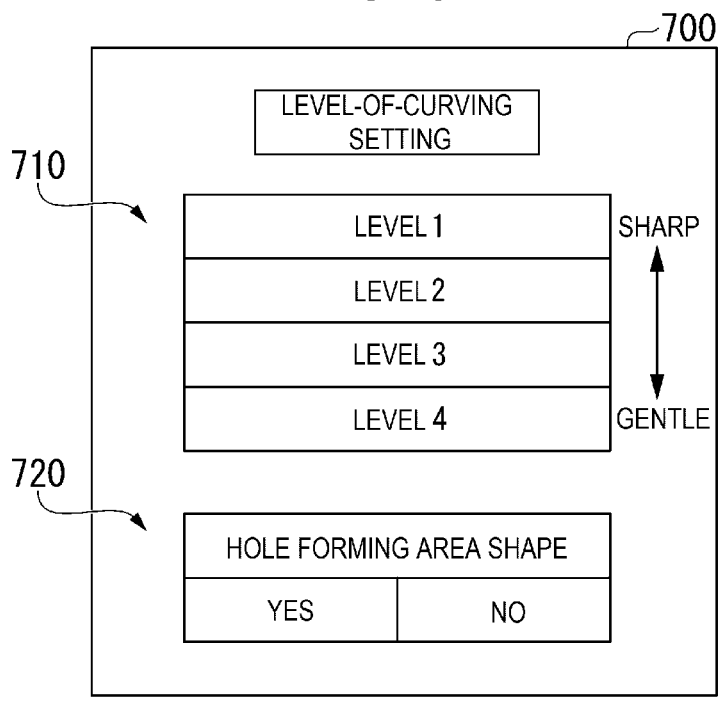
FIG. 9 shows the setting menu.

In this embodiment, the user can set to what extend the level of curving is made gentler. FIGS. 8 and 9 show a setting menu displayed on the control panel 11. FIG. 8 shows a screen 600 for the user to set the recording medium. The user sets the recording medium on which to form a main image and a cut line, from among "paper", "sticker", "magnet sheet", and "plastic sheet" in a recording medium setting field 610. The magnet sheet has a thickness of approximately 240 μm. The plastic sheet has a thickness of approximately 0.3 mm. Therefore, it is assumed that the thickness of the recording medium increases in order of "paper", "sticker", "magnet sheet", and "plastic sheet" and that the hardness increases in this order, too. The user also sets whether to combine a hole forming area shape or not, in a hole forming area shape setting field 620. "YES" indicates combining a hole forming area shape. "NO" indicates not combining a hole forming area shape. In this embodiment, the level of curving of the curve included in the cut line is made gentler as the thickness of the recording medium becomes greater. Also, the level of curving of the curve included in the cut line is made gentler as the hardness of the recording medium become higher.

FIG. 9 shows a screen 700 for the user to set the level of curving. The user sets the level of curving of the cut line from among "level 1", "level 2", "level 3", and "level 4" in a level-of-curving setting field 710. It is assumed that the level of curving becomes gentler in order of "level 1", "level 2", "level 3", and "level 4". The user also sets whether to combine a hole forming area shape or not, in a hole forming area shape setting field 720. "YES" indicates combining a hole forming area shape. "NO" indicates not combining a hole forming area shape.

The contents of the settings set by the user on the screen 600 or the screen 700 are stored in the RAM 82.

Figure 10:
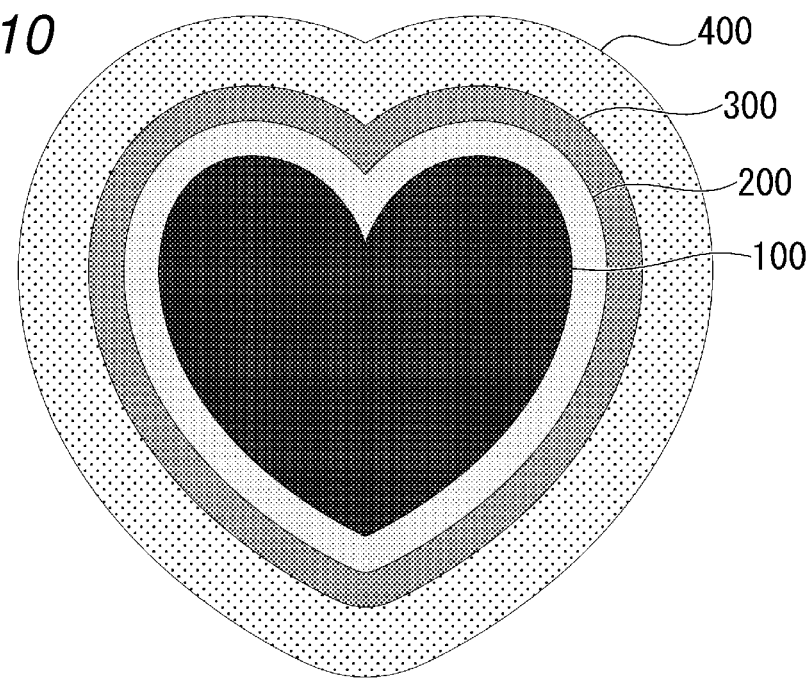
FIG. 10 shows an enlarged edge.

In this way, in this embodiment, the level of curving is changeable. The method for changing the level of curving will now be described. FIG. 10 shows a main image and an edge increased by a certain number of pixels (hereinafter referred to as "enlarged edge") as the edge of the main image. The enlarged edge is the envelope curve on the outer side of the main image, of the envelope curves of a circle with a radius R whose center is present on the edge of the main image, where R is the pixel value. Therefore, the enlarged edge is not formed by simply enlarging the main image. However, in the description below, the term "enlarged" is used for the sake of convenience. The processing of finding the envelope curve on the outer side of the main image, of the envelope curves formed when the center of the circle with the radius corresponding to R pixels is moved on the edge of the main image, is referred to as R-enlargement processing.

In FIG. 10, an enlarged edge 200 is an enlarged edge formed by enlarging the edge of the main image 100 by 20 pixels (hereinafter referred to as "20-enlarged edge". An enlarged edge 300 is an enlarged edge formed by enlarging the edge of the main image 100 by 40 pixels (hereinafter referred to as "40-enlarged edge". An enlarged edge 400 is an enlarged edge formed by enlarging the edge of the main image 100 by 80 pixels (hereinafter referred to as "80-enlarged edge". As shown in FIG. 10, the level of curving at the vertex becomes gentler as the number of pixels becomes larger.

Meanwhile, the enlarged edge acquired in this way is then reduced. Specifically, the envelope curve on the inner side of the enlarged edge, of the envelope curves of a circle with a radius r whose center is present on the enlarged edge, is found as an that is reduced (hereinafter referred to as "reduced edge"). Again, the reduced edge is not formed by simply reducing the enlarged edge. However, in the description below, the term "reduced" is used for the sake of convenience. The processing of finding the envelope curve on the inner side of the enlarged edge, of the envelope curves formed when the center of the circle with the radius corresponding to r pixels is moved on the enlarged edge, is referred to as r-reduction processing.

In this embodiment, there is a case where the edge acquired by performing the R-enlargement processing is defined as the cut line (referred to as "pattern A") and a case where the edge acquired by performing the r-reduction processing after performing the R-enlargement processing is defined as the cut line (referred to as "pattern B"). In this embodiment, one pattern is prepared as the pattern A, and three patterns B1 to B3 are prepared as the pattern B.

In the pattern A, the image processing unit 85 defines the edge acquired by performing 20-enlargement processing only, as the cut line. In the pattern B1, the image processing unit 85 defines the edge acquired by performing 20-reduction processing after performing 40-enlargement processing, as the cut line. In the pattern B2, the image processing unit 85 defines the edge acquired by performing 40-reduction processing after performing 60-enlargement processing, as the cut line. In the pattern B3, the image processing unit 85 defines the edge acquired by performing 60-reduction processing after performing 80-enlargement processing, as the cut line.

In this way, the processing is performed so that R−r=20 is achieved in any one of the patterns B. Thus, a cut line enlarged by approximately 20 pixels from the main image 100 is acquired in any one of the patterns.

Figure 11:
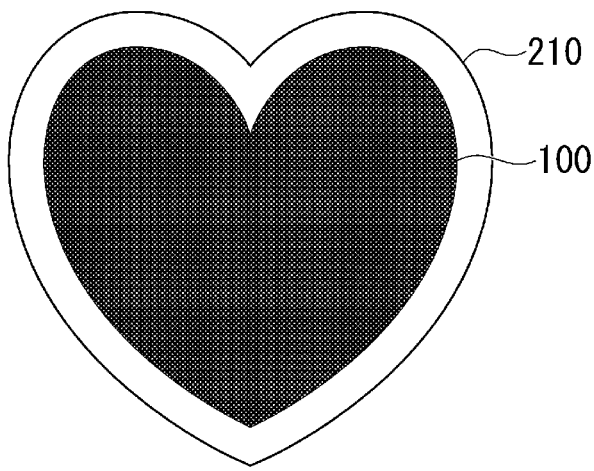
FIG. 11 shows a cut line acquired in a pattern A.
Figure 12:
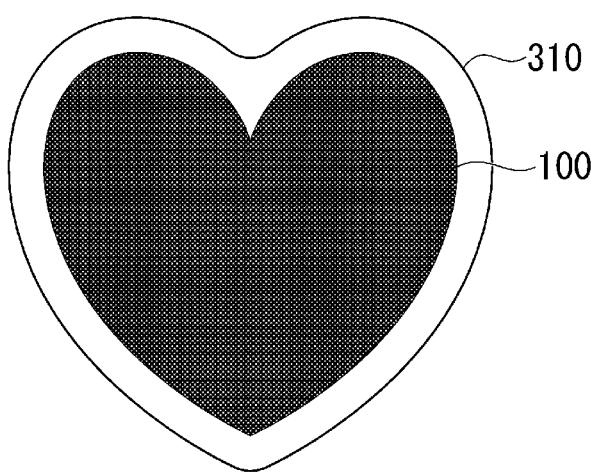
FIG. 12 shows a cut line acquired in a pattern B1.
Figure 13:
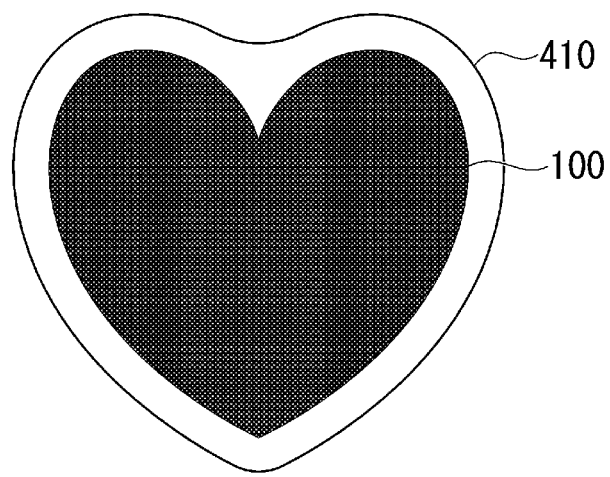
FIG. 13 shows a cut line acquired in a patter B3.

FIG. 11 shows a cut line 210 acquired in the pattern A. FIG. 12 shows a cut line 310 acquired in the pattern B1. FIG.

13 shows a cut line 410 acquired in the pattern B3. It can be seen that the cut line 310 has a gentler level of curving than the cut line 210. It can also be seen that the cut line 410 has a gentler level of curving than the cut line 310. In this way, the level of curving becomes gentler as R in the R-enlargement processing becomes greater. Therefore, the level of curving becomes gentler in order of the pattern A, the pattern B1, the pattern B2, and the pattern B3. This is not limited to the heart-shaped main image. For example, the level of curving can be made gentler even in a main image where complex convex and concave shapes are repeated.

Based on the contents of the description above, a flow of processing by the image processing unit 85 will now be described. FIG. 14 is a flowchart showing a flow of processing in the image forming device 1. This flowchart shows the processing in the case of performing one of the patterns A and B1 to B3. The data representing the main image is stored in the RAM 82. The image processing unit 85 performs processing using the data stored in the RAM 82. Also, the contents of settings set by the user are stored in the RAM 82, as described above.

In FIG. 14, the image processing unit 85 determines whether the main image is a convex image or not (ACT 101). The foregoing main image 100 is a concave image. However, in the case of a convex image, cutting the image is less likely to be hard even if the level of curving is not made gentler. Therefore, in this embodiment, for a convex image, the processing is performed only in the pattern A.

If the main image is a convex image (YES in ACT 101), the image processing unit 85 generates line information in the pattern A (ACT 103) and proceeds to ACT 109. If the main image is not a convex image (NO in ACT 101), the image processing unit 85 determines the content of setting is "paper" or "level 1", or not (ACT 102). If the content of setting is "paper" or "level 1" (YES in ACT 102), the image processing unit 85 generates line information in the pattern A (ACT 103) and proceeds to ACT 109.

If the content of setting is neither "paper" nor "level 1" (NO in ACT 102), the image processing unit 85 determines the content of setting is "sticker" or "level 2", or not (ACT 104). If the content of setting is "sticker" or "level 2" (YES in ACT 104), the image processing unit 85 generates line information in the pattern B1 (ACT 105) and proceeds to ACT 109.

If the content of setting is neither "sticker" nor "level 2" (NO in ACT 104), the image processing unit 85 determines the content of setting is "magnet sheet" or "level 3", or not (ACT 106). If the content of setting is "magnet sheet" or "level 3" (YES in ACT 106), the image processing unit 85 generates line information in the pattern B2 (ACT 107) and proceeds to ACT 109.

If the content of setting is neither "magnet sheet" nor "level 3" (NO in ACT 106), the content of setting is "plastic sheet" or "level 4". Therefore, the image processing unit 85 generates line information in the pattern B3 (ACT 108) and proceeds to ACT 109.

In ACT 109, the image processing unit 85 determines whether the setting is configured to have a hole forming area shape or not (ACT 109). If the setting is not configured to have a hole forming area shape (NO in ACT 109), the image processing unit 85 proceeds to ACT 111. If the setting is configured to have a hole forming area shape (YES in ACT 109), the image processing unit 85 generates line information with a hole forming area shape combined (ACT 110). The image forming unit 86 forms the main image with a non-decolorable material on the recording medium and forms the cut line represented by the line information with a decolorable material on the sheet (ACT 111) and then ends the processing.

In the processing shown in FIG. 14, a convex image is processed only in the pattern A. However, even a convex image may be processed in another pattern. In this embodiment, the cut line is formed with a decolorable material. Therefore, when the user cuts out the image along the cut line, the cut line that is left uncut, if any, can be erased by heating. Even if the main image is an image with a center void like a doughnut-shape, the cut line formed on the inner side can be erased by heating. In the foregoing embodiment, the processing using envelope curves to make the level of curving gentler is described. However, this is not limiting. For example, a straight line without any level of curving, as shown in FIG. 6, may be employed.

The image forming device according to the above embodiment can provide a technique that can suitably form a cut line.

The functions of the image forming device according to the above embodiment may be implemented by a computer. In that case, a program to implement the functions may be recorded in a computer-readable recording medium, and a computer system may read and execute the program recorded in the recording medium and thus may implement the functions. The "computer system" in this case includes an OS and hardware such as peripheral devices. The "computer-readable recording medium" refers to a portable medium such as a flexible disk, a magneto-optical disk, a ROM or a CD-ROM, or a memory device such as a hard disk built in the computer system. The "computer-readable recording medium" may also include a recording medium that dynamically holds the program for a short period of time, such as a communication line in the case of transmitting the program via a network like the internet or via a communication channel like a telephone line, or a recording medium that holds the program for a predetermined period of time, such as a volatile memory inside a computer system that serves as a server or a client in that case. The above program may be configured to implement a part of the foregoing functions or may be configured to be able to implement the foregoing functions in combination with a program already recorded in the computer system.

While some embodiments of the present disclosure have been described, these embodiments are presented simply as examples and are not intended to limit the scope of the present disclosure. These novel embodiments can be implemented in various other forms and can include various omissions, replacements, and changes without departing from the spirit and scope of the present disclosure. These embodiments and modifications thereof are included in the spirit and scope of the present disclosure and similarly included in the scope of the claims and equivalents thereof.

What is claimed is:
1. An image forming device, comprising:
   a line information generation component configured to generate line information representing a cut line to cut out a main image formed on a recording medium;
   an image forming component configured to form the main image with a non-decolorable material on the recording medium and form the cut line represented by the line information with a decolorable material on the recording medium, wherein
   the line information generation component changes a level of curving of a curve included in the cut line, according to the recording medium.

2. The image forming device according to claim 1, wherein the line information generation component makes the level of curving of the curve included in the cut line gentler as a thickness of the recording medium becomes greater.

3. The image forming device according to claim 1, wherein the line information generation component makes the level of curving of the curve included in the cut line gentler as a hardness of the recording medium becomes greater.

4. The image forming device according to claim 1, wherein
the line information generation component forms a closed curve that surrounds the main image and that forms an area where a predetermined shape is formed, as the cut line.

5. The image forming device according to claim 1, wherein
the line information generation component forms a closed curve having a shape of an area formed by a cut line similar to a shape of the main image.

6. The image forming device according to claim 1, further comprising:
an image processing component configured to determine whether the main image is a convex image or a concave image.

7. The image forming device according to claim 1, wherein
the non-decolorable material has multiple colors.

8. An image forming method, comprising:
generating line information representing a cut line to cut out a main image formed on a recording medium;
forming the main image with a non-decolorable material on the recording medium and forming the cut line represented by the line information with a decolorable material on the recording medium; and
changing a level of curving of a curve included in the cut line, according to the recording medium.

9. The image forming method according to claim 8, further comprising:
making the level of curving of the curve included in the cut line gentler as a thickness of the recording medium becomes greater.

10. The image forming method according to claim 8, further comprising:
making the level of curving of the curve included in the cut line gentler as a hardness of the recording medium becomes greater.

11. The image forming method according to claim 8, further comprising:
forming a closed curve that surrounds the main image and that forms an area where a predetermined shape is formed, as the cut line.

12. The image forming method according to claim 8, further comprising:
forming a closed curve having a shape of an area formed by a cut line similar to a shape of the main image.

13. The image forming method according to claim 8, further comprising:
determining whether the main image is a convex image or a concave image.

14. The image forming method according to claim 8, wherein
the non-decolorable material is black toner.

15. An image forming device, comprising:
a line information generation component configured to generate line information representing a cut line to cut out a main image formed on a recording medium;
an image forming component configured to form the main image with a black toner on the recording medium and form the cut line represented by the line information with a decolorable material on the recording medium, wherein
the line information generation component changes a level of curving of a curve included in the cut line, according to the recording medium.

16. The image forming device according to claim 15, wherein
the line information generation component makes the level of curving of the curve included in the cut line gentler as a thickness of the recording medium becomes greater.

17. The image forming device according to claim 15, wherein
the line information generation component makes the level of curving of the curve included in the cut line gentler as a hardness of the recording medium becomes greater.

18. The image forming device according to claim 15, wherein
the line information generation component forms a closed curve that surrounds the main image and that forms an area where a predetermined shape is formed, as the cut line.

19. The image forming device according to claim 15, wherein
the line information generation component forms a closed curve having a shape of an area formed by a cut line similar to a shape of the main image.

20. The image forming device according to claim 15, further comprising:
an image processing component configured to determine whether the main image is a convex image or a concave image.

* * * * *